Oct. 25, 1966    J. PAWLOWSKI ET AL    3,281,124
RESIDENCE TIME REACTOR

Filed Jan. 14, 1965    2 Sheets-Sheet 1

INVENTORS:
JURI PAWLOWSKI, HERBERT BARTL, RUDOLF HAUPT.

BY Burgan, Dinklage &
Sprung
ATTORNEYS

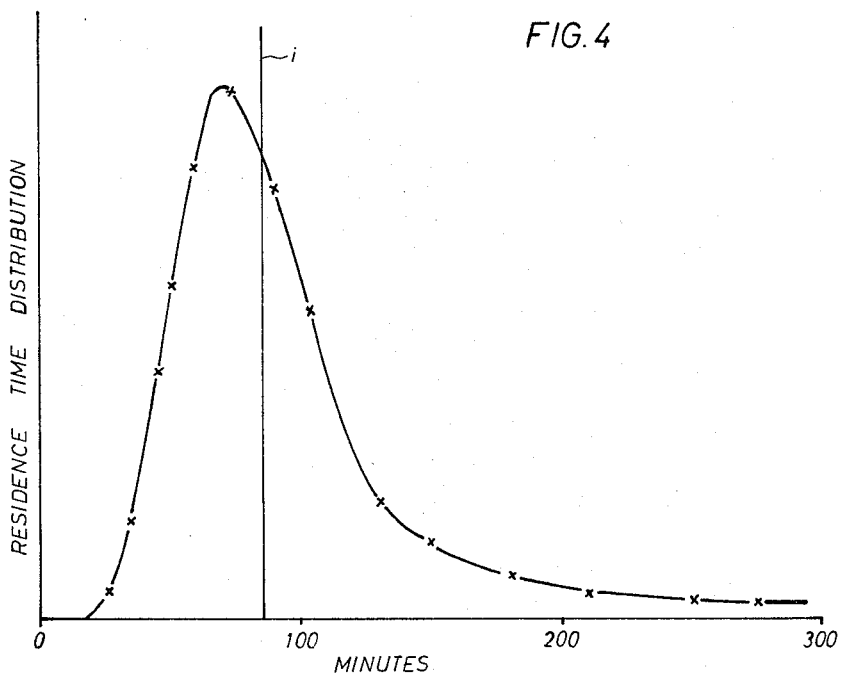

United States Patent Office

3,281,124
Patented Oct. 25, 1966

3,281,124
RESIDENCE TIME REACTOR
Juri Pawlowski, Leverkusen, Herbert Bartl, Cologne-Stammheim, and Rudolf Haupt, Leverkusen-Bayerwerk, Germany, assignors to Farbenfabriken Bayer Aktiengesellschaft, Leverkusen, Germany, a corporation of Germany
Filed Jan. 14, 1965, Ser. No. 425,534
Claims priority, application Germany, Dec. 15, 1960, F 32,762
6 Claims. (Cl. 259—8)

This application is a continuation-in-part of application Serial No. 158,731, now abandoned, filed December 12, 1961.

The invention relates to a residence time reactor, which comprises a cylindrical container having a stirrer device rotatably mounted about the longitudinal axis of the container for mixing of reaction material, particularly liquids, continuously passed through the container.

A large number of continuous processes in chemical technology and other branches of industry are carried out in a plurality of series-connected devices of this type, which make up so-called multi-stage reactors or cascade reactors. They are generally characterized by good transverse mixing and almost no longitudinal mixing of the reaction components between the separate reaction stages. Small residence time distribution of the reaction materials renders possible a more favorable course of the reaction and gives better yield.

Although the efficiency of a reactor consisting of a plurality of series-connected containers with stirrer mechanisms can be improved by increasing the number of containers, it is necessary in practice to limit the number of reactor stages. This is because difficulties arise in respect to construction, cost, difficult cleaning of the equipment, and increased likelihood of breakdown with each additional stage.

It has now been found that a multi-stage reaction effect is achieved in a single container with a stirrer mechanism if the stirrer comprises a frame member on which liquid-pervious rings having for example wire-like coverings fitted in the plane of the ring are arranged in stages and at a distance from one another, the planes of said coverings being parallel to one another and perpendicular to the axis of rotation of the frame member.

Thus, the multistage nature of the reactor is not achieved by any rigidly arranged fittings or rotating partitions and the like, but is produced exclusively by the form of flow in liquid material which is to be reacted or mixed.

The invention is further described in reference to the accompanying drawings, wherein:

FIG. 4 is a residence time distribution diagram.

In the various views of the drawing, like reference characters indicate corresponding parts.

Figure 1:
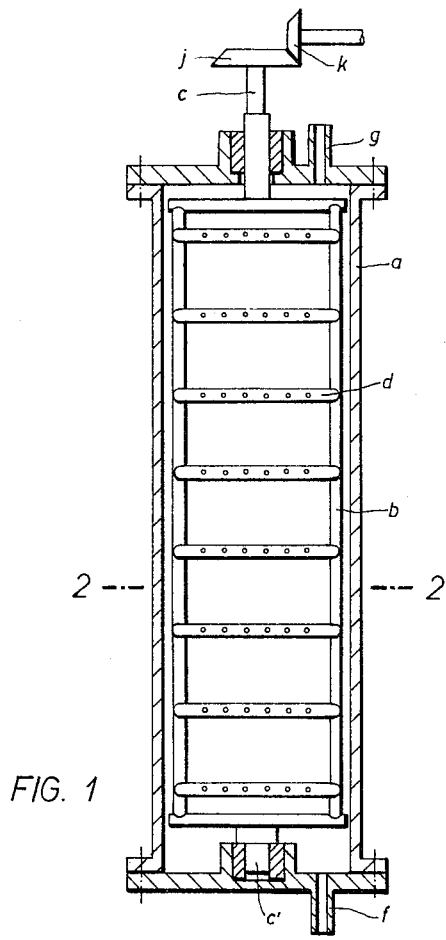
FIG. 1 is a cross-sectional view, in elevation, of a reactor according to the invention.

Referring to the drawings, a reactor according to the invention can comprise a longitudinally extending vessel $a$ having an inlet $f$ at one end thereof and an outlet $g$ at the other end thereof. The vessel is advantageously of cylindrical form, and mounted within the vessel is a frame $b$, which preferably is rectangular. The frame $b$ is rotatably mounted, having an upper spindle $c$ and a lower spindle $c'$ received in sliding surface bearings. Two opposite sides of the frame are disposed generally parallel to the axis of the vessel $a$, and the frame $b$ is disposed so that the plane thereof passes through the axis of the vessel. Pervious members $d$, preferably of disc form, are disposed within the vessel, perpendicular to the vessel axis and mounted on the frame $b$ at spaced intervals, for rotation with the frame.

The pervious members are composed of a frame and a wire work within the frame. The wire work may be in various forms. In the embodiment illustrated in the drawing, the wire work consists of a number of small diameter bars $e$ disposed in parallel relation, and bridging the area enclosed by the circular ring member $d$.

In a preferred embodiment, the pervious members $d$ are disposed at equally spaced intervals. This provides improved operation in respect to the load on the reactor, in that it distributes the load uniformly over the length of the reactor.

Means are provided for rotating the frame $b$. Thus, a crown gear $j$ is mounted on the spindle $c$ and this crown gear is driven by the gear $k$, which in turn is driven by a motor (not shown).

Figure 3:
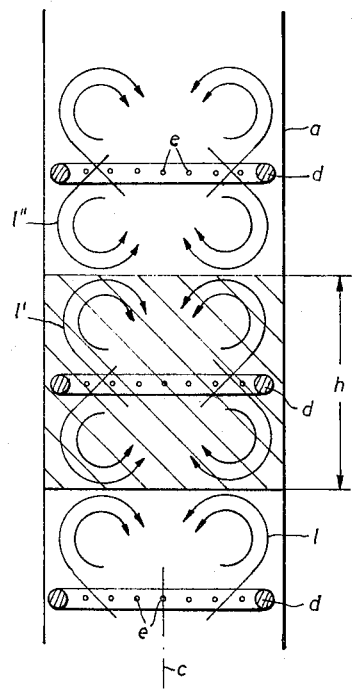
FIG. 3 is a schematic showing indicating the flow of fluid material in a section of a reactor of the invention, the reactor being shown in elevation.
Figure 2:
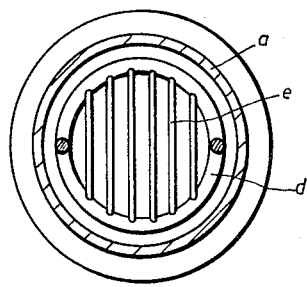
FIG. 2 is a cross-sectional view taken on line 2—2 in FIG. 1.

In the operation of the reactor, material, preferably liquid reactants, is passed through the reactor from the inlet $f$ to the outlet $g$, and the frame $b$, and therefore the pervious disc members $d$ are rotated. The mixer element composed of the frame $b$ and the pervious disc members $d$, by reason of rotation thereof, impart characteristic current to the material passed through the reactor. On the one hand, the material is turned about the axis of the reactor, while on the other hand, as is depicted in FIG. 3, the circulating currents $l$ form and the currents $l$ move radially outwardly adjacent the wire works in the pervious members $d$; as the currents approach the wall of the vessel $a$, they turn away from the pervious members $d$ and pass in a direction generally parallel to the wall of the vessel $a$. Thus, between adjacent pervious members $d$, there are opposing currents, as for example the current $l'$ and the current $l''$, shown in FIG. 3. Due to mutual influence of opposing currents, the opposing currents are turned radially inwardly, and the material then flows toward the axis of the disc. Thus, currents as are depicted in FIG. 3 develop within the reactor, and there then exists a plurality of defined zones, of height $h$. These zones are of a height equal to the spacing of the pervious members $d$ (where the pervious members $d$ are equally spaced) and each pervious member is disposed in the middle portion of the zone. Due to this current flow of material, little back mixing occurs, and the material tends to flow from the inlet of the reactor to the outlet thereof without the occurrence of objectionable back mixing. The mixing zones of height $h$ are substantially sharply separated and there are what may be called "phase of boundaries" between the adjacent zones.

Good mixing effect is obtained within each mixing zone or cell $h$, whereas the movement of material from one cell to the next adjacent cell is impeded. This can be demonstrated by filling one of the reactors with liquid and without any flow through the reactor, putting the mixer element in rotation, and then injecting a dyestuff into one of the cells. The dyestuff is quickly distributed throughout the particular cell or mixing zone $h$ into which it is injected, but the adjacent cells do not become discolored for a substantial period of time. If a pressure differential is then applied as between the inlet and the outlet of the reactor, the material then flows axially through the vessel and there is thereby realized a multi-stage cascade reactor system.

In FIG. 3, there is shown a residence time distribution diagram which has been established experimentally in a tube having 5 flow cells. The distribution becomes narrower and conforms to the mean residence time ($\bar{t}$) as the number of cells is increased.

A reactor construction according to the invention makes it possible to employ a large number of reaction stages. Also, due to the character of the currents of material in the reactor, there is a substantially reduced amount of deposition and accumulation of material within the reactor.

In an application of the reactor of the invention wherein a viscous liquid mass is passed through the reactor at a velocity of 1.2 cm./min., the Reynolds number ($Re = w \cdot d/v$, where $w = 1.2$ cm./min., $d$ is the diameter of the tube, and $v$ is the cinematic viscosity of the liquid) can be 19. The stirrer can rotate at 55 r.p.m. to provide a circulating motion of the liquid associated with a second Reynolds number, $R = \pi n d^2/30v$, of 4000. The extent of axial flow or back mixing can be expressed in terms of the Bodenstein number, $Bo$, which is determined by experiments from the residence time behavior of the respective flow apparatus. The larger the value of $Bo$, the more effective is the inhibition of back mixing. $Bo$ values of 85 and better can be obtained with the apparatus of the invention. $Bo$ values of above 200 have been obtained with this apparatus.

While the invention has been described with respect to particular embodiments thereof, it will be appreciated that these embodiments are merely representative and do not serve to define the limits of the invention.

What is claimed is:

1. A residence time reactor for mixing of material comprising a longitudinally extending vessel, an inlet to said vessel adjacent one end thereof, an outlet adjacent the other end thereof, a frame rotatably mounted in the vessel with two opposite sides thereof disposed generally parallel to the axis of the vessel, a plurality of pervious planar members disposed within the vessel perpendicular to the vessel axis and mounted on said frame at spaced intervals and for rotation with the frame, and means for rotating said frame.

2. Reactor according to claim 1, said pervious members being disposed at equally spaced intervals.

3. Reactor according to claim 1, said pervious members comprising a frame and wirework within the frame.

4. A residence time reactor for mixing of material comprising a longitudinally extending cylindrical vessel, an inlet to said vessel adjacent one end thereof, an outlet adjacent the other end thereof, a rectangular frame rotatably mounted in the vessel with two opposite sides thereof disposed generally parallel to the axis of the vessel and with the plane thereof passing through the axis of the vessel, a plurality of pervious disc members disposed within the vessel perpendicular to the vessel axis and having diametrically opposite peripheral portions thereof secured to the frame at spaced intervals and for rotation therewith, and means for rotating said frame.

5. Reactor according to claim 4, said pervious members being disposed at equally spaced intervals.

6. Reactor according to claim 5, said pervious members comprising a frame and wirework within the frame.

References Cited by the Examiner

UNITED STATES PATENTS

| 1,033,649 | 7/1912 | Young | 259—134 |
| 1,826,200 | 10/1931 | Byers et al. | 259—134 |
| 1,913,787 | 6/1933 | Basseau | 138—37 X |

FOREIGN PATENTS 22,993 11/1930 Netherlands.

WALTER A. SCHEEL, *Primary Examiner.*

WILLIAM I. PRICE, *Examiner.*

J. M. BELL, *Assistant Examiner.*